No. 786,397. Patented April 4, 1905.

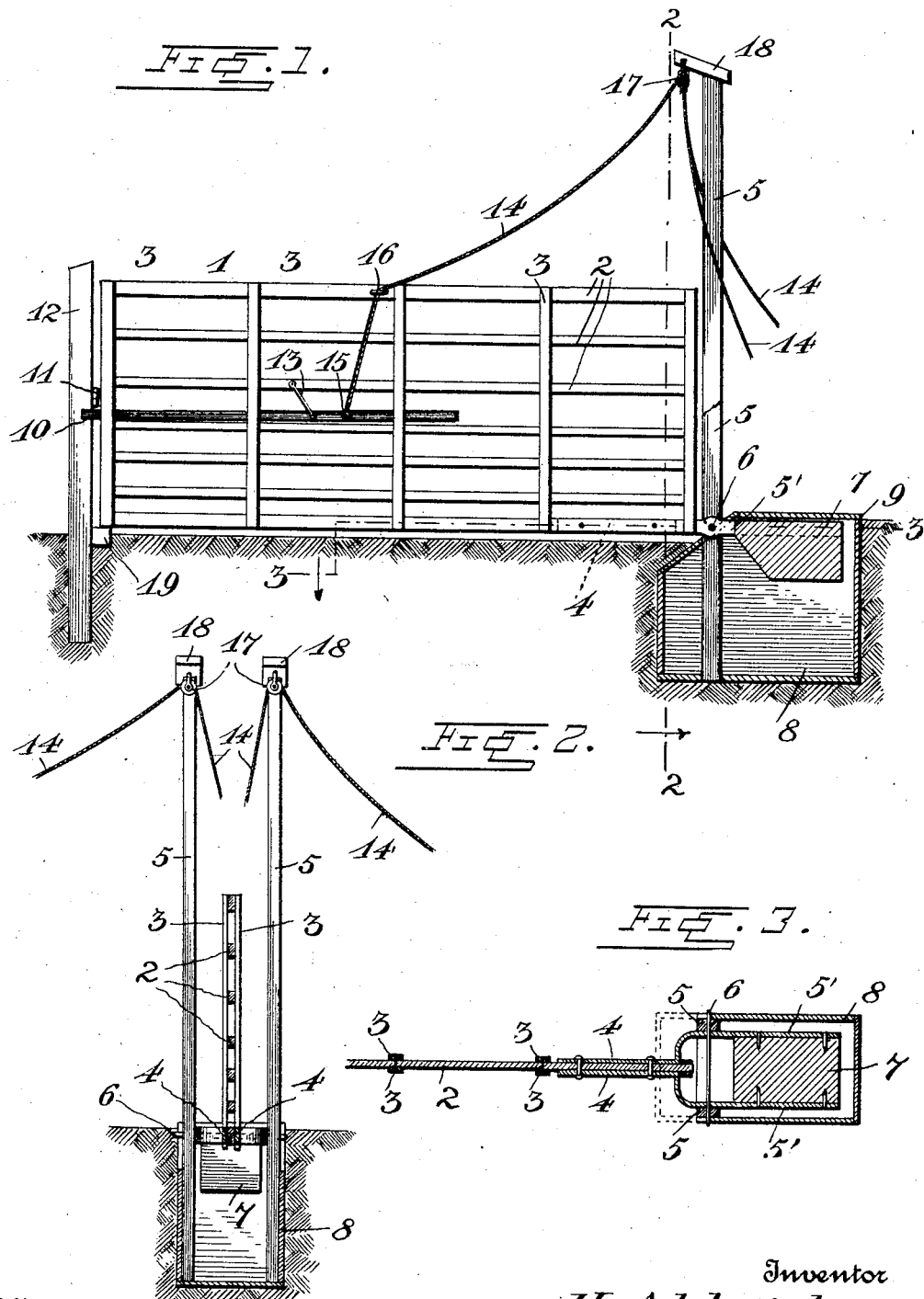

UNITED STATES PATENT OFFICE.

HARM AHLRICHS, OF PETERSBURG, ILLINOIS.

TILTING GATE.

SPECIFICATION forming part of Letters Patent No. 786,397, dated April 4, 1905.

Application filed January 12, 1905. Serial No. 240,798.

*To all whom it may concern:*

Be it known that I, HARM AHLRICHS, a citizen of the United States, residing at Petersburg, in the county of Menard and State of Illinois, have invented certain new and useful Improvements in Tilting Gates; and I do declare the following to be a full, clear, and exact description of the invention, such as will enable others skilled in the art to which it appertains to make and use the same.

My invention relates to improvements in farm-gates of the vertical tilting type; and it consists in certain novel features of construction, combination, and arrangement of parts hereinafter described and claimed.

The object of my invention is to provide a device of this character which will be simple in construction, durable in use, efficient in operation, and comparatively inexpensive to manufacture.

The above and other objects, which will appear as the nature of my invention is better understood, are accomplished by the construction illustrated in the accompanying drawings, in which—

Figure 1 is a side elevation, partly in section, of a tilting gate constructed in accordance with my invention. Fig. 2 is a vertical transverse sectional view taken on the line 2 2 of Fig. 1, and Fig 3 is a horizontal sectional view taken on the line 3 3 of Fig. 1.

Referring to the drawings by numeral, 1 denotes a gate which may be of any desired form and construction, but which, as shown, consists of a series of longitudinal bars 2, united at their ends and at intermediate points by pairs of parallel upright bars 3.

Secured to the lower rear portion of the gate 1 is a pair of rearwardly-extending parallel arms 4, which have their outer portions offset, as shown at 5. These arms are upon opposite sides of the gate and project between a pair of parallel posts 5, from which the gate is pivotally suspended by a pivot bolt or pin 6, which is passed through alining openings formed in the arms 4 and said posts 5. The posts 5 are spaced apart sufficiently to allow the gate to swing freely between them.

To assist in raising and lowering the gate, I provide a counterbalancing-weight 7 and secure the same between the offset outer ends 5 of the arms 4. This weight 7 may be of any form and construction and is adapted to swing in a box or casing 8, which is embedded in the earth between the lower ends of the posts 5, the top 9 of said box or casing lying flush with the surface of the ground and the weight 7 being in the upper portion of the box or casing when the gate is in its closed position, as clearly shown in Fig. 1 of the drawings.

The gate 1 has a latch 10, which coacts with a keeper 11 upon the usual latch-post 12. Said latch 10 is in the form of a bar, mounted to slide and swing between the pairs of upright bars 3 of the gate, and it is pivotally suspended by a loose link or chain 13. The latch 10 is operated and the gate 1 raised to its open position by means of cords or other flexible connections 14, each of which has one of its ends secured, as at 15, upon the latch 10. These cords or cables 14 are passed upwardly through guide-eyes 16 upon the upper portion of the gate and through guide-pulleys 17, which are mounted upon angularly-disposed blocks or plates 18, secured upon the upper ends of the posts 5. The opposite ends of the cords or cables 14 may lead to any desired point from which it is desired to operate the gate. It will be seen that when one of the cords 14 is drawn upon the latch 10 will be slid or swung rearwardly from beneath the keeper 11, so that the gate when thus freed will be swung to a vertical position, the weight 7 permitting the gate to be elevated by a very light pull upon the cord 14. In order to limit the downward movement of the gate, I provide upon the lower portion of the latch-post 12 a stop 19, as shown in Fig. 1.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In combination with a pair of supporting-posts, spaced apart, and each having at its upper end an arm and a pulley carried thereby, a latch-post, a gate having at its inner, lower end a pair of bars secured to opposite sides thereof and projecting rearwardly therethrough, said bars being pivotally mounted between the lower portions of said supporting-posts, to adapt the gate for vertical angular movement, a counterbalancing-weight carried by the rearwardly-extending arms of the said bars, a latch-bar carried and guided by the gate, a swinging link carried by the gate and suspending the latch-bar, and operating-cords to raise the gate, engaging the said pulleys and attached to the said latch-bar to move the latter longitudinally to release position to raise the gate.

In testimony whereof I have hereunto set my hand in presence of two subscribing witnesses.

HARM AHLRICHS.

Witnesses:
FRANK E. BLANE,
DAVID L. BENNETT.